March 15, 1966  B. DOYLE  3,240,060
VORTEX RATE SENSOR
Filed Sept. 18, 1962
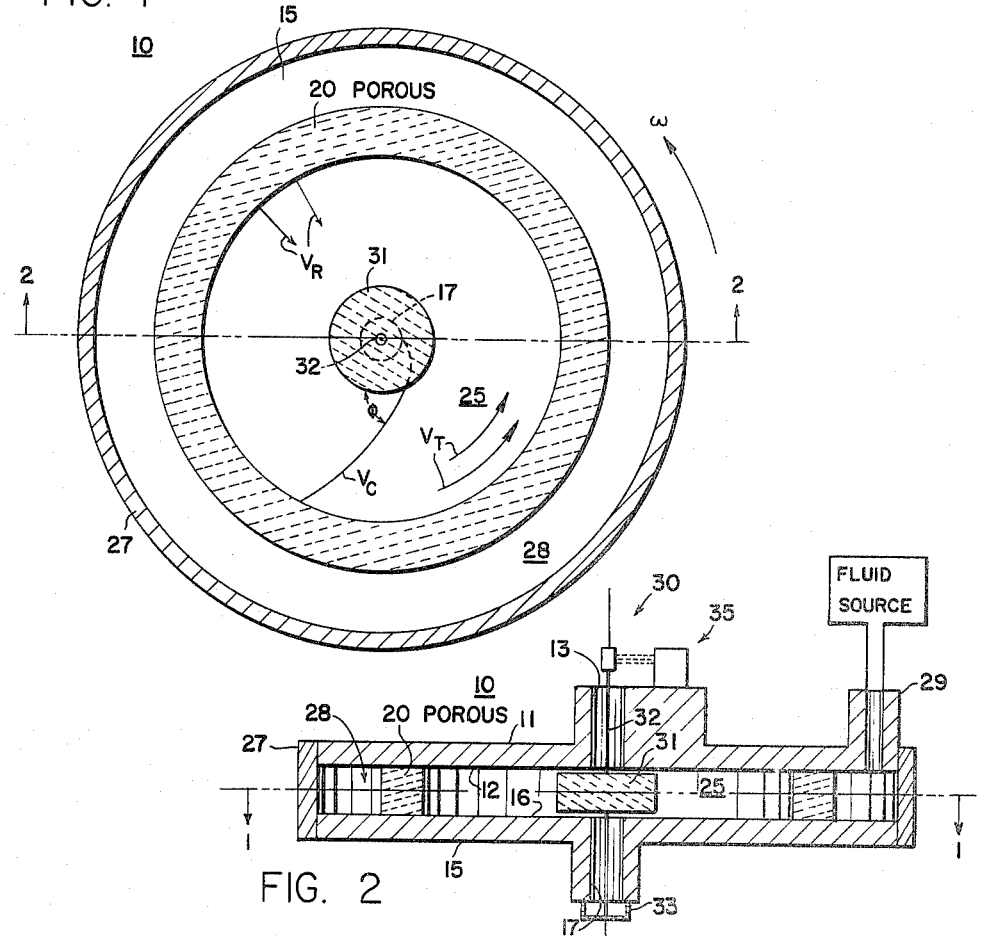
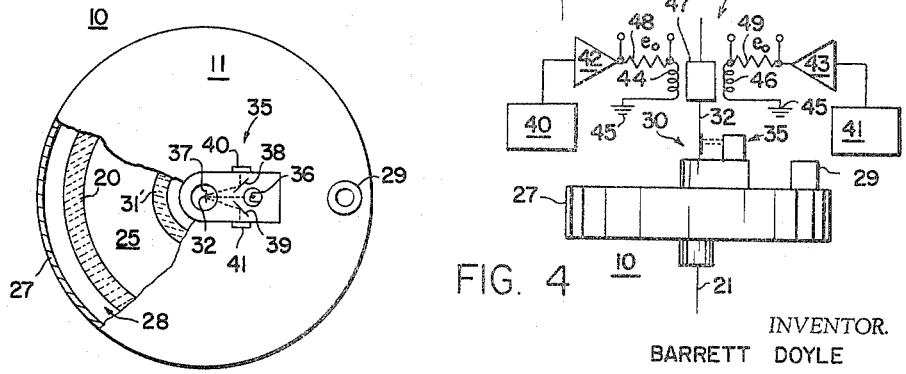
INVENTOR.
BARRETT DOYLE
BY Roger W. Jensen
ATTORNEY

United States Patent Office 3,240,060
Patented Mar. 15, 1966

3,240,060
VORTEX RATE SENSOR
Barrett Doyle, New Brighton, Minn., assignor to Honeywell Inc., a corporation of Delaware
Filed Sept. 18, 1962, Ser. No. 224,452
8 Claims. (Cl. 73—194)

This invention pertains to vortex rate sensing instruments and more particularly to unique readout means for vortex rate sensing instruments.

A vortex rate sensor generally comprises a device which provides a fluid flow field which closely approximates the classical two-dimensional pure sink flow in the absence of an input rate. The fluid flow in such a pure sink flow has only radial velocity. When the vortex rate sensor is subjected to a rate (angular velocity) input relative to inertial space, a pure vortex flow having only tangential or rotational velocity is superimposed upon the pure sink flow. The superimposition of a pure vortex flow upon a pure sink flow results in a combined vortex-sink fluid flow field in which the fluid streamline pattern is a logarithmic spiral, if the viscous effects of the flowing fluid are neglected. Sensing the effect of the input rate upon the fluid flow field provides a measurement of the input rate.

It should be noted that the vortex rate sensor possesses the unique and desirable characteristic of amplification of the parameter to be sensed (angular velocity) within the sensing device itself. Various amplification levels may be obtained by varying the geometry of the vortex rate sensor. The amplification is due to two phenomena: (1) In order to satisfy the equation of continuity, the radial velocity of a pure sink flow must increase as the fluid approaches the sink or the outlet passage of the vortex rate sensor because of the narrowing of the streamlines; (2) In order to satisfy the principle of the conservation of angular momentum, the tangential or rotational velocity of a pure vortex flow must increase as the flow approaches the sink or outlet passage. It follows that the velocity of the fluid in the combined vortex-sink flow increases as the fluid approaches the sink or outlet passage.

As pointed out perviously, sensing the effect of the rate input upon the fluid flow field of the vortex rate sensor provides a measurement of the input rate. However, analysis and experimentation point out the difficulty in attempting to sense the effect of the rate input upon the fluid flow field. It is difficult to produce a useable signal of the effect of the rate input upon the fluid flow field without destroying this effect. For example, when the fluid utilized in the vortex rate sensor is a gas, any obstruction placed in the fluid flow field to sense the effect of the rate input thereupon destroys the fluid flow field pattern. In order to circumvent such a problem, the prior art approach has been to position various readout means within the outlet passage of a vortex rate sensor so as to minimize the effect of the readout means upon the fluid flow field of the vortex rate sensor.

The applicant has provided a unique readout means for sensing the effect of the rate input upon the fluid flow field of a vortex rate sensor by positioning a porous coupling means within the chamber of the vortex rate sensor. The porous coupling means is rotatably mounted relative to the structure defining the chamber so that any vortical fluid flow (rotational or tangential velocity of the fluid) within the vortex rate sensor will result in rotation of the porous coupling means. The term porous as utilized in this specification means permeable to fluids. Means are provided to sense the rotation of the coupling means relative to the structure defining the vortex rate sensor so as to produce an output signal indicative of the rotation of the coupling means. Since the coupling means is rotated in response to a rate input, the output signal is indicative of the rate input.

It is therefore an object of this invention to provide an improved vortex rate sensor.

This and other objects of the invention will become apparent from a study of the accompanying specification and claims in conjunction with the drawings in which:

FIGURE 1 is a cross sectional view of a vortex rate sensor taken along lines 1—1 of FIGURE 2;

FIGURE 2 is a cross sectional view taken along lines 2—2 of FIGURE 1;

FIGURE 3 is a partial cross sectional view of a vortex rate sensor; and

FIGURE 4 is a schematic electrical diagram of one embodiment of the applicant's invention.

Referring now to FIGURES 1 and 2, reference numeral 10 generally depicts a vortex rate sensor. A cylindrical element 11 is provided having a plane surface 12 thereon. Element 11 has a central passage 13 therethrough having a circular cross section. A second cylindrical element 15 is provided having a plane surface 16 thereon. Element 15 has a central passage 17 therethrough having a circular cross section. Although passages 13 and 17 are illustrated as cylindrical, other configurations of passages 13 and 17 are within the scope of the applicant's invention.

Reference numeral 20 depicts annular porous coupling means. Coupling means 20 may be fabricated from any material which is porous in nature so as to allow fluid to pass therethrough with a limited amount of restriction. For example, porous coupling means 20 may be fabricated from sintered metals or ceramics.

Coupling means 20 is positioned between elements 11 and 15 so as to maintain plane surfaces 12 and 16 in a spaced parallel relationship. Coupling means 20 is rigidly attached to elements 11 and 15 by suitable means (not shown) such as adhesives and fixed with respect thereto. The axis of coupling means 20 is identified by reference numeral 21. Axis 21 is substantially perpendicular to plane surfaces 12 and 16.

Elements 11 and 15 in combination with coupling means 20 collectively define a cylindrical vortex chamber 25. The outer periphery of chamber 25 is defined by the inner periphery of coupling means 20. The ends of chamber 25 are defined by plane surface 12 of element 11 and plane surface 16 of element 15.

A generally cylindrically shaped element 27 is positioned around the outer periphery of elements 11 and 15 enclosing the space therebetween. Element 27 is rigidly attached to elements 11 and 15 by suitable means (not shown) such as screws or adhesives. Element 27 is spaced apart from the outer periphery of coupling means 20 and in cooperation therewith defines a manifold 28 between elements 11 and 15. Fluid is supplied to manifold 28 through an ingress 29 which is connected to a fluid source.

While two passages 13 and 17 are illustrated, it should be pointed out that only one passage, for example, 13, is necessary for operation of vortex rate sensor 10.

A unique readout or signal producing means is provided and is identified by reference numeral 30. In the embodiment illustrated in FIGURES 1 and 2, readout means 30 includes a cylindrical porous coupling means 31 positioned within chamber 25. Other configurations of coupling means 31 are within the scope of the invention, for example, the coupling means may take the form of a ring 31' as illustrated in FIGURE 3. Coupling means 31 is rotatably mounted within chamber 25 by means of a suspension fiber 32. Suspension fiber 32 is fabricated from a material having a low mechanical hysteresis, such as quartz. Suspension fiber 32 is supported by swivel means (not shown) which are attached to bracket means which are attached to elements 15 and 11. One such bracket means 33 is illustrated near the end of passage 17. The bracket means adjacent the end of passage 13 has been omitted from the drawing for reasons of clarity. It will be noted that cylindrical coupling means 31 has a greater diameter than passages 13 and 17. Thus the fluid flow within chamber 25 impinges upon coupling means 31 before the fluid flow is directed out of chamber 25 through the passages 13 and 17. It is clear that coupling means 31 will sense the fluid flow field within chamber 25 before any possible disruption of the fluid flow as a result of exhausting through passages 13 and 17.

Readout means 30 also includes a means for providing an output signal indicative of the rotation of coupling means 31 relative to the structure defining chamber 25. An optical means 35 is illustrated in FIGURES 2 and 3. Optical means 35 comprises a light source 36 positioned upon element 11 and a reflecting means 37 attached to suspension fiber 32 by suitable means (not shown) such as adhesives. Two reflecting mirrors 38 and 39 are attached to element 11 intermediate light source 36 and reflecting surface 37 by suitable means (not shown). A pair of photocells 40 and 41 are attached to element 11 contiguous mirrors 38 and 39 respectively.

As is more clearly illustrated in FIGURE 3, when coupling means 31' is at its null position (no input to vortex rate sensor 10) radiation from light source 36 will be reflected by reflecting surface 37 back to light source 36 and will not impinge upon reflecting mirrors 38 and 39. Rotation of coupling means 31' in a counterclockwise direction as a result of a rate input to vortex rate sensor 10 will result in radiation from light source 36 being reflected from reflecting means 37 to reflecting mirror 38 and to photocell 40. Photocell 40 will generate a voltage signal indicative of the amount of rotation of coupling means 31'. Rotation of coupling means 31' in a clockwise direction results in an output signal from photocell 42. The electrical connections for the means for providing an output signal 35 have not been shown in FIGURES 2 and 3 for reasons of clarity. It should be pointed out that the applicant does not wish to be limited to the optical means 35 illustrated for sensing the rotation of coupling means 31'. Other means such as inductive means may be utilized and are within the scope of the applicant's invention.

In operation, a fluid flows from the fluid source through ingress 29 into chamber manifold 28. A pressure differential exists between manifold 28 and passages 13 and 17. Consequently the fluid flows from manifold 28 through coupling means 20, chamber 25, coupling means 31' and out of chamber 25 through passages 13 and 17. In the absence of any rate input (angular velocity about axis 21) a fluid flow field within chamber 25 comprises only radial velocity as illustrated by vectors $V_R$ in FIGURE 1. A flow field having only radial velocity is described by those skilled in the art as a pure sink flow. When vortex rate sensor 10 is subjected to an input rate as indicated by reference symbol $\omega$, fluid located within coupling means 20 is given a tangential or rotational component of velocity as indicated by the vector $V_T$ in FIGURE 1. A flow field having tangential or rotational velocity only is referred to by those skilled in the art as a pure vortex flow. The superimposition of the pure vortex flow upon the pure sink flow results in the combined vortex-sink flow. The streamline pattern of the fluid flow, neglecting viscous effects in the combined vortex-sink flow is a logarithmic spiral as identified in FIGURE 1 by the reference symbol $V_C$. The fluid in chamber 25 flows parallel to the plane surfaces 12 and 16 and exhausts therefrom through passages 13 and 17.

The tangential or rotational component of velocity $V_T$ imparted to the fluid within coupling means 20 by rate input $\omega$ results in vortical fluid flow within chamber 25. Vortical fluid flow is the term used to define the combined vortex-sink flow. The magnitude of the vortical flow is amplified within vortex rate sensor 10 and is indicative of the rate input $\omega$. Consequently it is possible to define the rate input $\omega$ by determining the direction and magnitude of the vortical fluid flow within chamber 25.

With no input rate, the fluid flow in chamber 25 is a pure sink flow. Thus the fluid impinges upon and flows through coupling means 31' in a radial direction only, and there is no force acting upon coupling means 31' tending to rotate it. There will be no rotation of coupling means 31' relative to the means defining chamber 25 and optical means 35 will not produce an output signal.

When vortex rate sensor 10 is subjected to a rate input $\omega$, the fluid flow in chamber 25 is vortical in nature as illustrated by streamline $V_C$. The fluid flows through coupling means 31' and out of the chamber through passages 13 and 17. The momentum of the fluid having a rotational component of velocity is transferred to the coupling means when flowing therethrough exerting and exerts a force thereon tending to rotate coupling means 31' counterclockwise about axis 21. The rotation of coupling means 31' relative to the means defining chamber 25 will be sensed by optical means 35 and an output signal generated by photocell 40 indicative of the input rate $\omega$.

It should be noted that suspension fiber 32 is attached to bracket 33 so that bracket 33 does not impart a torque to suspension fiber 32 upon rotation of vortex rate sensor 10. In addition, although coupling means 31' and suspension fiber 32 will exhibit a slight rotation relative to the means defining chamber 25 upon rotation of vortex rate sensor 10 due to the inertia of coupling means 31' and suspension fiber 32, the error associated therewith is negligible.

The applicant's unique readout means provides a means for determining a sense of the rate input $\omega$. More specifically, the sense of a rate input will be determined by an output signal from either photocell 40 or photocell 41. In addition, the magnitude of the voltage output signal from photocells 40 and 41 is indicative of the magnitude of rate input $\omega$.

An alternate embodiment of the applicant's invention is disclosed in FIGURE 4. In this embodiment, means operable in response to the output signal of photocells 40 and 41 are provided for rebalancing the rotation of coupling means 31. Structural elements in FIGURE 4 similar to structural elements in FIGURES 1, 2 and 3 are identified by like reference numerals. The basic vortex rate sensor structure is similar to that disclosed and described in detail with reference to FIGURES 1 through 3 and further discussion thereof is not deemed necessary. Photocells 40 and 41 are schematically illustrated in FIGURE 4 as connected to a pair of amplifiers 42 and 43 respectively The output of amplifier 42 is connected in series relation with a resistor 48 and to one end of a winding 44. The opposite end of winding 44 is connected to ground as at 45. The output of amplifier 43 is connected in series relationship to a resistor 49 and to one end of a winding 46. The opposite end of winding 46 is connected to ground as at 45. An armature member 47 is attached by suitable means (not shown) to suspension fiber 32. Windings 44 and 46 are positioned contiguous armature 47. The applicant does not wish to be limited to the type of torquer schematically illustrated in FIGURE 4. Other means of rebalancing the rotation of coupling means 31 may be utilized and are within the scope of the applicant's invention.

In operation, an output signal from photocell 40 for example is conducted to amplifier 42. The output of amplifier 42 is conducted to resistor 48 and winding 44. Energization of winding 44 results in a torque being applied to armature 47 and consequently to suspension fiber 32 tending to oppose the relative rotation thereof. The voltage $e_0$ across resistor 48 is indicative of the rebalance torque applied to coupling means 31 and is also indicative of the input rate $\omega$. Thus it is clear that the alternate embodiment of the applicant's invention operates as a null seeking apparatus wherein the relative rotation of coupling means 31 is rebalanced by torquer 50.

While I have shown and described specific embodiments of my invention, further modifications and improvements will occur to those skilled in the art. I desire it to be understood, therefore, that this invention is not limited to the specific embodiments shown and I intend in the appended claims to cover all modifications which do not depart from the spirit and scope of this invention.

I claim:

1. In a vortex rate sensor: a first element having a first passage therethrough; a second element having a second passage therethrough; annular porous coupling means positioned between and rigidly attached to said first and said second elements so as to form a cylindrical chamber; means for causing fluid flow into said chamber through said annular coupling means and out through said first passage and said second passage; readout means including cylindrical porous coupling means rotatably mounted within said chamber and means operable to produce a signal indicative of the rotation of said cylindrical coupling means, the axis of said first passage, the axis of said second passage, and the axis of said cylindrical coupling means being substantially coaxial with the axis of said annular coupling means, said cylindrical coupling means being rotated relative to said first and said second elements in response to the vortical fluid flow within said chamber flowing therethrough; and means operable in response to said signal for substantially rebalancing the rotation of said cylindrical coupling means.

2. In a vortex rate sensor: a first element having a first passage therethrough; a second element; first annular porous coupling means positioned between and rigidly attached between said first and said second elements so as to form a cylindrical chamber; means for causing fluid flow into said chamber through said first coupling means and out through said passage; readout means including second annular porous coupling means rotatably mounted within said chamber and means for producing a signal indicative of the rotation of said second coupling means, the axis of said second coupling means being substantially coaxial with the axis of said first coupling means, said second coupling means being rotated relative to said first and said second elements in response to the vortical fluid flow within said chamber flowing therethrough; and means operable in response to said signal for substantially rebalancing the rotation of said second coupling means.

3. In a vortex rate sensor: a first element having a first plane surface thereon and a passage therethrough, the axis of said passage being substantially perpendicular to said first plane surface; a second element having a second plane surface thereon; first porous coupling means positioned between and attached to said first plane surface and said second plane surface thereby forming a cylindrical chamber, the axis of said chamber being substantially perpendicular to said first plane surface and said second plane surface; means for causing fluid flow into said chamber through said first coupling means and out through said passage; readout means including second porous coupling means rotatably mounted within said chamber and means operable to produce a signal indicative of the rotation of said second coupling means, said second coupling means being rotated relative to said first and said second elements in response to the vortical fluid flow within said chamber flowing therethrough; and means operable in response to said signal for substantially rebalancing said second coupling means.

4. In a vortex rate sensor: a first element having a first plane surface thereon and having a passage therethrough, the axis of said passage being substantially perpendicular to said first plane surface; a second element having a second plane surface thereon; first porous coupling means positioned between and attached to said first plane surface and said second plane surface thereby forming a cylindrical chamber; means for causing fluid flow into said chamber through said first coupling means and out through said passage; and readout means including second porous coupling means rotatably mounted within said chamber and means operable to produce a signal indicative of the rotation of said second coupling means in response to the vortical fluid flow within said chamber flowing therethrough.

5. In a vortex rate sensor: a first element having a passage therethrough; a second element; first porous coupling means, said first element, said second element and said first coupling means cooperating to form a cylindrical chamber; means for causing fluid flow into said chamber through said first coupling means and out through said first coupling means cooperating to form a cylindrical chamber; means for causing fluid flow into said chamber and means for producing a signal indicative of the rotation of said second coupling means in response to the vortical fluid flow within said chamber flowing therethrough, the axis of said second coupling means being substantially coaxial with the axis of said chamber.

6. In a vortex rate sensor having a chamber with a peripheral fluid inlet and a central fluid outlet therein and means for causing fluid flow into said chamber through said inlet and out through said outlet; and readout means including porous coupling means rotatably mounted within said chamber and means for providing an output signal indicative of the rotation of said coupling means, said coupling means being rotated in response to the vortical fluid flow within said chamber flowing therethrough.

7. In a control apparatus:
   a first element having a plane surface thereon and having a fluid outlet passage therethrough;
   a second element having a plane surface thereon;
   annular porous coupling means positioned between and attached to said elements and extending between said surfaces to thereby form a cylindrical chamber;
   means for causing fluid flow into said chamber through said coupling means and out through said outlet passage;
   and vortical fluid flow sensing means including an annular member positioned within said chamber substantially aligned with said outlet passage, said member being characterized by allowing fluid to flow therethrough, said member being disposed in the path of fluid flow from said coupling means through said outlet passage, said member having such dimensions that at least the major part of the fluid flow must pass through said member, said member being essentially unaffected by radial flow of fluid therethrough but tending to rotate in the presence of vortical flow, therethrough and said sensing means further including means operable to produce a signal indicative of the rotation of said annular member.

8. A vortex rate sensor having a chamber with a peripheral fluid inlet and a central fluid outlet therein,
   said chamber being adapted to have fluid flow therethrough,
   the fluid flow being radial when said vortex rate sensor is not subjected to an angular velocity and vortical when said vortex rate sensor is subjected to an angular velocity about an input axis;
   and means responsive to said vortical flow including a porous coupling means which allows fluid flow therethrough and torque sensing means, said coupling means being positioned within said chamber and arranged so that the fluid flows through said coupling means, and said torque sensing means providing an output signal indicative of the torque applied to the said coupling means in response to vortical fluid flow within said chamber flowing through said coupling means.

References Cited by the Examiner

UNITED STATES PATENTS

| | | |
|---|---|---|
| 1,841,606 | 1/1932 | Kollsman. |
| 2,215,447 | 9/1940 | Kollsman. |
| 3,074,280 | 1/1963 | Huebschmann. |

FOREIGN PATENTS

| | | |
|---|---|---|
| 116,375 | 6/1918 | Great Britain. |

RICHARD C. QUEISSER, *Primary Examiner.*

S. FEINBERG, *Examiner.*

L. L. HALLACHER, ED GILHOOLY,
*Assistant Examiners.*